United States Patent [19]

Kester

[11] Patent Number: 5,273,792

[45] Date of Patent: Dec. 28, 1993

[54] CURED EPOXY RESINS EXHIBITING SECOND-ORDER NONLINEAR OPTICAL RESPONSE

[75] Inventor: John J. Kester, Midland, Mich.

[73] Assignee: The Dow Chemical Company, Midland, Mich.

[21] Appl. No.: 852,924

[22] Filed: Mar. 13, 1992

Related U.S. Application Data

[63] Continuation of Ser. No. 441,731, Nov. 27, 1989, abandoned.

[51] Int. Cl.$^5$ ............... C08G 59/00; C08G 59/40; G02F 1/00
[52] U.S. Cl. ............... 428/1; 525/481; 525/482; 525/483; 525/484; 525/523; 525/526; 525/534; 528/89; 528/90; 528/93; 528/94; 528/102; 528/103; 528/104; 528/107; 528/108; 528/109; 528/111; 528/113; 528/114; 528/117; 528/118; 528/120; 528/123; 528/124; 528/250; 528/341
[58] Field of Search ............... 528/89, 90, 93, 94, 528/102, 103, 104, 107, 108, 109, 111, 113, 114, 117, 118, 120, 123, 124, 250, 341, 361, 373, 393, 399, 407, 502, 503; 525/481, 482, 483, 484, 523, 526, 534; 428/1, 413

[56] References Cited

U.S. PATENT DOCUMENTS

| | | | |
|---|---|---|---|
| 4,762,901 | 8/1988 | Dhein et al. | 528/73 |
| 4,764,581 | 8/1988 | Muller et al. | 528/100 |
| 4,921,928 | 1/1990 | Tanino et al. | 528/94 |
| 4,959,439 | 9/1990 | Tanino et al. | 528/94 |
| 5,093,471 | 3/1992 | West | 528/418 |

FOREIGN PATENT DOCUMENTS

63-169619 7/1988 Japan.

OTHER PUBLICATIONS

Chemical Abstracts, vol. 84, No. 12, Mar. 22, 1976, Columbus, Ohio, U.S., abstract No. 751505, A. A. Voronin: "Epoxide Composition", p. 41.
D. R. Ulrich: "Polymers for Nonlinear Optical Applications", vol. 189, Oct. 1990, pp. 3-38.
DE-A-1, 129,281 (Bayer).
M. Eich et al, *J. Appl. Phys.*, 66(7):3241-3247 (1989).
B. Reck et al, *SPIE*, 1147: 74-83 (1989).

*Primary Examiner*—Frederick Krass

[57] ABSTRACT

The present invention is directed to a novel epoxy polymeric composition resulting from reacting (A) at least one compound containing an average of more than one epoxide group per molecule with (B) at least one curing agent for component (A). At least a portion of the curing agent (B) is at least a first curing agent compound which contains (a) an average of more than one active amine hydrogen atom per molecule and (b) an average of at least one aromatic ring which contains at least one pendant monovalent electron withdrawing group. The present invention also includes a process for preparing the above polymeric materials. The polymeric materials of the present invention also exhibit nonlinear optical capabilities when formed into an optically transparent medium with a noncentrosymmetric alignment of molecules. The nonlinear optical materials of the present invention are useful in electrooptic devices for use in communications and data-processing. Nonlinear optical films produced from the polymeric material show a reduced tendency to reorient due to thermal motion.

38 Claims, No Drawings

CURED EPOXY RESINS EXHIBITING SECOND-ORDER NONLINEAR OPTICAL RESPONSE

CROSS-REFERENCE TO RELATED APPLICATION

This is a continuation of application Ser. No. 441,731, filed Nov. 27, 1989, now abandoned.

FIELD OF THE INVENTION

The present invention relates to novel epoxy polymeric materials, nonlinear optical (NLO) materials prepared from the novel polymeric materials which can be useful in nonlinear optical devices, and a process for preparing the novel epoxy polymeric materials and NLO materials. More particularly, the present invention relates to amine cured epoxy resins for nonlinear optics and a process for preparing said amine cured epoxy resins.

BACKGROUND OF THE INVENTION

Information is more rapidly processed and transmitted using optical as opposed to electrical signals. There exists a need for finding nonlinear optical materials, and processes for preparing such materials, which alter the transmission of optical signals or serve to couple optical devices to electrical devices, i.e., electrooptic devices.

Some materials which have been used in electrooptic devices include semiconductors such as lithium niobate, potassium titanyl phosphate and gallium arsenide and most recently, organic materials which have been doped with nonlinear optical materials. Generally, polymeric organic materials can or may have the specific advantages of fast response time, small dielectric constant, good linear optical properties, large nonlinear optical susceptibilities, high damage threshold, engineering capabilities, and ease of fabrication.

There are various known polymeric organic materials which possess specific nonlinear optical properties and various known processes for making such polymeric organic materials. Many of the current polymeric organic materials prepared by the prior art are prepared by blending a NLO molecule into a polymer host material. "Blending" herein means a combination or mixture of materials without significant reaction between specific components.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 183. The above-recited publications are incorporated herein by reference.

EP 218,938 discloses one method of making a polymer with nonlinear optical properties by incorporating molecules which have nonlinear optical (NLO) properties into a host polymer. The NLO molecules are incorporated into the host polymer by blending. The NLO molecules in the polymer can be aligned by an electric field while the temperature of the polymeric material is raised above its glass transition temperature and then cooled to room temperature. EP 218,938 discloses a number of polymer host materials, including epoxies, and many types of molecules which have NLO activity including azo dyes such as disperse red 1.

PCT Application WO8802131A also describes a method of blending a substance having nonlinear optical properties, such as 2-methyl-4-nitroaniline, into a commercially available curable epoxy resin polymer to prepare an electrooptical material.

It is also known to incorporate a NLO active group such as azo dye Disperse Red I (4,-[N-ethyl-N-(2-hydroxyethyl] amino-4-nitro azobenzene), by simply blending the azo dye in a thermoplastic material such as poly(methylmethaerylate), as described in Applied Physics Letters 49(5), 4 (1986). In this paper, an aromatic amine is disclosed but the amine is not covalently bonded to the polymer chain. In addition, the paper discloses an NLO molecule which has an electron donor and acceptor group at either end of the molecule.

A problem associated with a polymer with NLO properties produced by simply blending NLO molecules into a host polymer is that these polymer materials lack stability of orientation, i.e., there is a great amount of molecular relaxation or reorientation within a short period of time resulting in a loss of NLO properties. For example, as reported by Hampsch et al., Macromolecules 1988, 21, 528–350, the NLO activity of a polymer with NLO molecules blended therein decreases dramatically over a period of days.

Generally, the incorporation of molecular structures which have NLO activity into the backbone of a polymer chain will decrease the likelihood of the structural reorganization in comparison with polymers in which the NLO active molecule is simply blended. It is therefore desirable to provide a polymer material with NLO groups covalently bonded to the backbone of the polymer material to minimize relaxation effects.

U.S. Pat. No. 4,703,096 discloses a polymer composition in which the NLO activity is derived from aromatic structures attached to a polymeric diacetylenic backbone. However, the synthesis of the material described in U.S. Pat. No. 4,703,096 is complicated.

There is a continuing effort to develop new nonlinear optical polymers with increased nonlinear optical susceptibilities and enhanced stability of nonlinear optical effects. It would be highly desirable to have organic polymeric materials, particularly polymeric materials based on epoxy resins, with larger second and third order nonlinear properties than presently used inorganic electrooptic materials.

One object of the present invention is to provide a novel epoxy polymeric composition having anisotropic properties.

Another object of the present invention is to provide epoxy resin based polymers which exhibit nonlinear optical effects.

Still another object of the present invention is to provide epoxy resin based polymers which have enhanced stability of nonlinear optical effects.

SUMMARY OF THE INVENTION

One aspect of the present invention is a composition comprising the reaction product of: (A) at least one compound containing an average of more than one epoxide group per molecule with (B) at least one curing agent for compound (A) whereby at least a portion of said curing agent (B) is at least a first curing agent which contains (a) an average of more than one active amine hydrogen atom per molecule and (b) an average of at least one aromatic ring which contains at least one pendant monovalent electron withdrawing group.

Another broad aspect of the invention is a process for making a composition by reacting (A) at least one compound containing an average of more than one epoxide group per molecule with (B) at least one curing agent for compound (A) whereby at least a portion of said curing agent (B) is at least a first curing agent which contains (a) an average of more than one active amine hydrogen atom per molecule and (b) an average of at least one aromatic ring which contains at least one pendant monovalent electron withdrawing group under reaction conditions to produce a cured epoxy polymer.

Still another aspect of the present invention is a nonlinear optical composition having nonlinear optical properties which is characterized by a reaction product resulting from reacting (A) at least one compound containing an average of more than one epoxide group per molecule with (B) at least one curing agent for compound (A) whereby at least a portion of said curing agent (B) is at least a first curing agent which contains (a) an average of more than one active amine hydrogen atom per molecule and (b) an average of at least one aromatic ring which contains at least one pendant monovalent electron withdrawing group.

Yet another aspect of the present invention is a process for producing a nonlinear optical composition comprising applying a stress to the reaction product resulting from the reaction of: (A) at least one compound containing an average of more than one epoxide group per molecule with (B) at least one curing agent for compound (A) whereby at least a portion of said curing agent (B) is at least a first curing agent which contains (a) an average of more than one active amine hydrogen atom per molecule and (b) an average of at least one aromatic ring which contains at least one pendant monovalent electron withdrawing group whereby the stress applied to the reaction product is sufficient to induce a net orientation in moieties of the first curing agent in the product and provide the product with nonlinear properties.

Still another aspect of the present invention is to provide a device which has incorporated therein a component of a nonlinear optical composition having nonlinear optical properties which is characterized by a product resulting from reacting: (A) at least one compound containing an average of more than one epoxide group per molecule with (B) at least one curing agent for compound (A) whereby at least a portion of said curing agent (B) is at least a first curing agent which contains (a) an average of more than one active amine hydrogen atom per molecule and (b) an average of at least one aromatic ring which contains at least one pendant monovalent electron withdrawing group.

DETAILED DESCRIPTION OF PREFERRED EMBODIMENTS

The present invention provides a reaction product composition resulting from reacting, as a first component (A) at least one compound containing an average of more than one epoxide group per molecule with, as a second component (B) at least one curing agent for component (A). In accordance with the present invention, at least a portion of the curing agent (B) is advantageously at least a first curing agent compound which contains an average of more than one active amine hydrogen atom per molecule and an average of at least one aromatic ring which contains at least one pendant monovalent electron withdrawing group.

The term "electron-donating" group as employed herein refers to organic substituents which contribute n-electrons to a conjugated electronic structure. An electron donating group can be, for example, $-NH_2$.

The term "electron-withdrawing" as employed herein refers to organic substituents which attract n-electrons from a conjugated electronic structure. Illustrative of electron-withdrawing substituents which are employed herein are $NO_2$, $CN$, $CHO$, $CO_2R$, $CO_2NH$, $-P(O)(OR)_2$, $-PR_3^+$, $-NR_3^+$, $-SR_2^+$ where each R is independently a hydrogen or an aliphatic, cycloaliphatic or aromatic hydrocarbon having from 1 to about 12 carbon atoms.

The term "conjugating" group as employed herein refers to a group which has the ability to transfer charge from the electron-donating group to the electron withdrawing group through a conjugated system of double bonds. Conjugating groups include groups which have, for example, a hydrocarbyl diradical composed of aromatic rings optionally linked by carbon-carbon, carbon-nitrogen, or nitrogen-nitrogen double bonds. This conjugating group may be substituted with pendant radicals such as alkyl, aryl, eyano, halo, and nitro.

The present invention is based on the discovery of novel compositions of cured epoxy resins, for example, epoxy resins which have been cured with aromatic amines with election withdrawing substituents and that such novel compositions possess nonlinear optical (NLO) properties. The nonlinear optical properties of the novel compositions are derived from the dipole moment induced by the electron withdrawing group attached to an aromatic ring. Polymerization or curing of the epoxy/aromatic amine mixture stabilizes the aromatic amine to thermal reorientation forces. Preferably, in addition to using aromatic amines with nonlinear optical properties, other amines are used as curing agents can be included in a reaction mixture for polymerization to form the compositions of the present invention. Nonlinear optical amines can be used to completely polymerize the mixture or nonlinear optical amines can be used in combination with other amines to provide increased stabilization of the resulting polymer.

The first component (A) of the present invention includes a wide variety of epoxy-containing compounds. Generally, the first component (A) is any compound having an average of more than one epoxide group per molecule. Preferably, the first component (A) is any compound having an average of more than one vicinal epoxide group per molecule. More preferably, the component (A) may be any compound containing an average of more than one glycidyl group per molecule. Even more preferably, the component (A) can be glycidyl ethers, glycidyl esters or glycidyl amines.

Illustrative of the preferred glycidyl ethers used in the present invention are the glycidyl ethers of polyhydric phenols including for example, the glycidyl ethers of phenol or substituted phenol such as the aldehyde novolac resins particularly phenol-formaldehyde resins and cresol-formaldehyde resins. The glycidyl ethers of polyhydric phenols also may include the glycidyl ethers of bisphenols or substituted bisphenols such as the glycidyl ether of bisphenol A. Other examples of glycidyl ethers of polyhydric phenols useful in the present invention are described in U.S. Pat. No. 4,330,659 incorporated herein by reference, for example diglycidyl ethers of bisphenols corresponding to the formula:

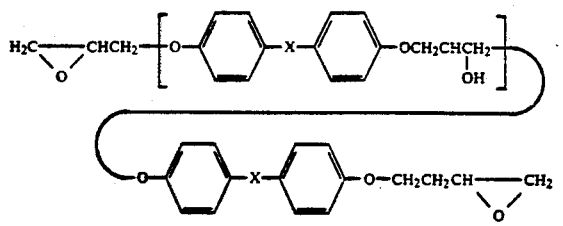

wherein m is 0 to about 50 and X is —CH$_2$—,

These represent, respectively, bisphenols F, A, S and AP. Other applicable ethers include the diglycidyl ethers of resorcinol, catechol, hydroquinone, and the like. The various ethers may be substituted on the respective phenyl rings by such non-reactive

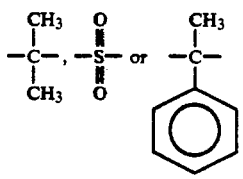

substituents as alkyl, halogen, and the like. The glycidyl ethers of compounds having more than one aromatic hydroxyl group per molecule are disclosed in U.S. Pat. No. 4,829,133, incorporated herein by reference for the teachings of these epoxy resins. The glycidyl ethers of hydrocarbon-phenol resins disclosed in U.S. Pat. No. 4,710,429, incorporated herein by reference, may also be used in the present invention.

Component (A) of the present invention also includes di- or polyepoxides of aliphatic or cycloaliphatic compounds containing more than one epoxidizable unsaturated group, for example, the diepoxides of cyclohexadiene, butadiene and the like.

The epoxy-containing compound suitably used herein can be a monomer, oligomer or polymer resin. Epoxy monomers and oligomer units suitably used herein are described in the *Encyclopedia of Chemical Technology*, vol. 9, pp 267–290, published by John Wiley & Sons, 1980. Examples of the epoxy resins suitably used herein include novolak epoxy resins such as cresol-novolak epoxy resins and epoxy phenol novolak resin; bisphenol-A epoxy resins such as diglycidyl ethers of bisphenol A; cycloalkyl epoxy resins; glycidyl amine resins; triazine resins; hydantoin epoxy resins and combinations thereof.

Some commercial epoxy resins useful in the present invention include, for example, D.E.R. TM 331, D.E.R. TM 332, D.E.R. TM 383, D.E.N. TM 431 and D.E.R. TM 736, all commercially available from The Dow Chemical Company.

Any combination of the aforementioned epoxy-containing compounds may be used herein. Therefore, another embodiment of the present invention is the use of a mixture or a blend of epoxy-containing compounds. The epoxy compositions may contain the same or other moieties with electron-withdrawing groups.

The epoxy compound used herein may be an epoxy compound which does not exhibit a NLO response or an epoxy compound which does exhibit a NLO response. For example, an epoxy compound which exhibits an NLO response and which may be used in the present invention may be an epoxy compound described in U.S. patent application Ser. No. 441,805, filed of even date herewith, by Kester et al., incorporated herein by reference. An example of an epoxy compound, disclosed in U.S. Ser. No. 441,805, which exhibits an NLO response and may be used herein is tetraglycidylsulfonyldianiline.

A solvent may be used, if desired, to dissolve an epoxy compound for example when using certain solid epoxy resins. Suitable solvents which can be employed herein include, for example, glycol ethers, ketones, aromatic hydrocarbons, alcohols, amides, combinations thereof and the like. Particularly suitable solvents employed herein include, for example, methyl ethyl ketone, acetone, methanol, dimethylformamide, ethylene glycol methyl ether, propylene glycol methyl ether, combinations thereof and the like.

The second component (B) of the present invention is a curing agent for component (A). At least a portion of the curing agent (B) is advantageously at least a first curing agent compound which contains (a) an average of more than one active amine hydrogen atom per molecule and (b) an average of at least one aromatic ring which contains at least one pendant monovalent electron withdrawing group.

The first curing agent employed herein may be represented by the following general formula:

A—Ar—X          Formula I where A is a pendant monovalent electron-withdrawing group, for example, A may be selected from the group consisting of NO$_2$, CN, CHO, CO$_2$R, CO$_2$NH, —P(O)(OR)$_2$, —PR$_3^+$, —NR$_3^+$, —SR$_2^+$ where each R is independently a hydrogen or an aliphatic, cycloaliphatic or aromatic hydrocarbon having from 1 to about 12 carbon atoms; Ar is a conjugating group, for example, Ar may be selected from the group consisting of

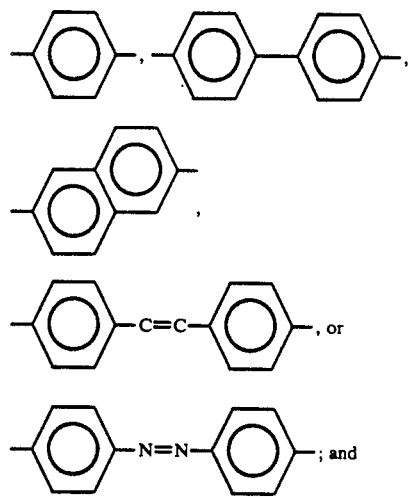

X is an electron-donating group, for example, X may be selected from the group consisting of —NH$_2$ or —R—NH$_2$ where R is the same as described above.

An example of the first curing agent suitably used herein is an aromatic amine compound having the following general formula:

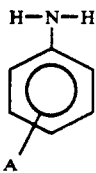

Formula II where A is a divalent electron-withdrawing substituent as described above.

Another example of the first curing agent suitably used herein is an aromatic amine compound having the following general formula:

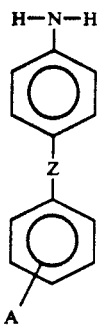

Formula III where A is an electron-withdrawing group as described above and Z is an unsaturated bridge between the aromatic rings. The unsaturated bridge between the aromatic rings represented by Z in the above Formula III can be for example, an azo such as —N=N— or any olefinic group such as —CH=CH—.

Preferably, the aromatic amine compounds of Formula I contain an electron-withdrawing group which is attached to the aromatic ring in the para position. Molecules with aromatic amines and electron-withdrawing groups which may be incorporated into epoxy resins of the present invention include, for example, paranitroaniline (PNA), nitrobenzyl amine, disperse orange three, nitro-phenylene diamine, methyl nitroaniline (MNA), amino nitropyrimidine, 2-6-diamine 4-nitrotoluene, 5-nitrobenzotriazole and combinations thereof.

Examples of other first curing agents which can be used in the present invention include, for example, the amines disclosed in U.S. Pat. Nos. 4,659,177; 4,707,303 and 4,707,305 which are hereby incorporated by reference. Examples of amines which are useful as first curing agents in the present invention and disclosed in the above U.S. Patents are quinodimethane compounds, diphenoquinodimethane compounds and naphthoquinodimethane compounds Component (B) of the present invention may comprise substantially all of the first curing agent compound or component (B) may be a mixture of two or more curing agents wherein at least a portion of component (B) is at least one first curing agent and the remainder of component (B) is one or more second curing agent compounds.

Suitable second curing agent compounds which can be employed herein include, for example, amines, acids or anhydrides thereof, biguanides, imidazoles, ureaaldehyde resins, melamine-aldehyde resins, phenolics, halogenated phenolics, sulfides, combinations thereof and the like. These and other curing agents are disclosed in Lee and Neville's *Handbook of Epoxy Resins*, McGraw-Hill Book Co., 1967 which is incorporated herein by reference. Particularly suitable curing agents include, for example, dicyandiamide, diaminodiphenylsulfone, 2-methylimidazole, diethylenetoluenediamine, bisphenol A, tetrabromobisphenol A, phenolformaldehyde novolac resins, halogenated phenolformaldehyde resins, hydrocarbon-phenol resins, combinations thereof and the like.

The amines suitably employed herein can be multifunctional aliphatic, such as, diethylene triamine or triethylenetetramine, or aromatic amines, such as, metaphenylene diamine or methylene dianiline. Some commercial curing agents useful in the present invention include D.E.H. TM 20 and D.E.H. TM 24 commercially available from The Dow Chemical Company.

The second curing agent compound may be a compound which does not exhibit a NLO response or a compound which does exhibit a NLO response. For example, a second curing agent compound which exhibits a NLO response and which may be used in the present invention may be a compound described in U.S. patent application Ser. No. 441,783, filed of even date herewith, by J. J. Kester, incorporated herein by reference. An example of a second curing agent disclosed in U.S. Ser. No. 441,783 which exhibits a NLO response and may be suitably used herein is diaminodiphenylsulfone.

The compositions of the present invention advantageously exhibit a nonlinear optical response. Accordingly, the present invention also includes a nonlinear optical material comprising an epoxy resin based composition having nonlinear optical moieties chemically bonded to the resultant polymer. The nonlinear optical moieties of the epoxy polymer are pendant groups attached to the backbone of the polymeric material.

Because of the presence of a charge asymmetry in the pendant moiety in the polymer of the present invention, the present invention polymer with a noncentrosymmetric molecular configuration advantageously exhibits second order nonlinear optical susceptibility.

Generally, the first curing agent of the present invention which contains a strong electron withdrawing group will have a reduced reactivity towards epoxy resin reactions. A catalyst is, therefore, preferably used to facilitate the reaction without degradation or homopolymerization of the resin. A quantification of the level of electron-withdrawing capability is given by the Hammett $\sigma$ (sigma) constant. This well known constant is described in many references, for instance, J. March *Advanced Organic Chemistry* (McGraw Hill Book Company, New York, 1977 edition) p. 251-259. The Hammett constant values range from an electron donating group $\sigma_p = -0.66$ for $NH_2$ to an electron withdrawing group $\sigma_p = 0.78$ for a nitro group. ($\sigma_p$ indicating para substitution.)

The type of electron-withdrawing groups useful in the present invention are, preferably, any substituent which has a positive Hammett constant. More preferably, a Hammett constant of $\sigma_p >$ about 0.52, and even more preferably a Hammett constant of $\sigma_p >$ about 0.63 (which is the constant for a cyano substituent) is used in the present invention.

Generally, the amounts of components (A) and (B) employed herein are sufficient to provide a cured product. Usually the amounts of components (A) and (B) which provide a ratio of equivalents of curing agent per epoxy groups of from about 0.5 to about 1.2; preferably from about 0.75 to about 1.1 and more preferably from about 0.95 to about 1.05 are used herein.

The percentage of first curing agent should be sufficient to provide a cured product with NLO properties. Generally the percent of first curing agent used herein may be from about 0.1 percent to about 100 percent with respect to the stoichiometry of the epoxy groups. It is preferable to use at or near 100 percent of the first curing agent. The percentage of the second curing agent used may be the remainder if anything less than 100 percent of the first curing agent is used, e.g. from 0 to about 99.9 percent.

Various factors will effect the range of the percentage of first and second curing agents relative to the number of epoxy groups. These factors include the optical absorption of the NLO group, the level of stability required, and the strength of the NLO group. In general, the level of addition of NLO moieties to polymer will be as high as possible to maximize the NLO effect. The level at addition will be balanced by the stability and quality of the film desired to be produced. The NLO moieties of the present invention are in a pendant configuration which will lower the Tg relative to a more highly crosslinked polymer and the related stability of the resultant polymer by lowering the crosslink density. The optimal NLO molecule reacted into the chain would not lower the stability of the polymer. Typically, an addition of less about 20 percent of a non-crosslinking group will not significantly decrease the stability of the polymer. NLO signals have been observed in polymers having about 3 to about 100 percent addition of NLO moieties with respect to the number of epoxies.

A preferred range of percentages for incorporated NLO moieties is from about 0.5 percent to about 100 percent. For polymers with the greatest stability the preferred range is from about 0.5 percent to about 50 percent. For polymers with the greatest NLO activity the preferred range is from about 50 to about 100 percent.

In carrying out one embodiment of the process of the present invention, component (A), for example, an epoxy-containing compound is reacted with component (B), for example, an aromatic amine compound under reaction conditions to form the novel composition of the present invention. For example, a class of anisotropic polymers is produced from reacting an epoxy resin with the monomers of Formula I.

To fully incorporate a first curing agent having a strong electron-withdrawing group, a catalyst is advantageously used in the present invention. It is also preferred to carry out the reaction with a catalyst present to facilitate opening of the oxirane ring. For example, the catalyst can be 2-methyl imidazole. Preferably, the reaction is carried out in the presence of a catalyst because of the relative unreactivity of the aromatic amines of the first curing agent containing electron-withdrawing substituents.

One advantage of the present invention is the versatility of incorporation of amines into the backbone of epoxy resin based polymers. Amines, including aromatic amines with electron withdrawing groups, can be covalently bond into a polymer matrix. Thus a wide variety of amines can be utilized in this invention.

Catalysts which are suitably used here include, for example, tetrabutylphosphonium acetate, boron trifluoride monoethylamine, benzyldimethyl amine, and 2-methyl imidazole. The catalyst 2-methyl imidazole is the most preferred because it tended to work without introducing additional ionic species into the product material. The reduction of ionic species in the polymer material is important for its reduction of conductivity which can lead to a catastrophic breakdown during the orientation process of the polymer product.

Suitable catalysts or promoters or accelerators which can be employed in the preparation of the compositions of the present invention may include, for example, tertiary amines, imidazoles, phosphonium compounds, ammonium compounds, sulfonium compounds, mixtures thereof and the like.

Suitable tertiary amines include, for example, triethylenediamine, N-methylmorpholine, triethylamine, tributylamine, benzyldimethylamine, tris(dimethylaminomethyl)phenol, mixtures thereof and the like.

Suitable imidazoles include, for example, 2-methylimidazole, 1-propylimidazole, mixtures thereof and the like.

Suitable phosphonium compounds include, for example, those disclosed by Dante et al. in U.S. Pat. No. 3,477,990, Perry in Canadian Pat. No. 893,191 and U.S. Pat. No. 3,948,855 and by Tyler, Jr. et al. in U.S. Pat. No. 4,366,295 all of which are incorporated herein by reference.

Suitable quaternary ammonium compounds include, for example, benzyl trimethyl ammonium chloride, benzyl trimethyl ammonium hydroxide, tetrabutyl ammonium chloride, tetrabutyl ammonium hydroxide, mixtures thereof and the like.

Without the addition of the catalyst no significant reaction between the epoxy group and the aromatic amine with a strong electron-withdrawing group is observed by NMR or size exclusion chromotography even at temperatures exceeding 220° C. The addition of the catalyst to the epoxy resin alone does not produce any reaction even at 175° C. as determined by HPLC. The combination of an amine compound such as p-nitroaniline (PNA), epoxy, and a catalyst produces the reaction products as described above. Other side reaction products are possible and are observed. These side reactions include the reaction of the amine with only one epoxy group and the reaction of the product shown above with other epoxy resins through the newly formed hydroxyl group.

Lower molecular weight aromatic amines will have substantial sublimation at elevated temperatures, for example, above 160° C. for paranitroaniline. Without the use of a catalyst the reaction of PNA with the epoxy resin is considerably reduced. The elevated temperatures and times required to produce the reaction would result in loss of the PNA by sublimation. In addition, homopolymerization by the epoxy will be thermally initiated. However, the addition of the catalyst lowers the temperature for the reaction of the PNA with the epoxy to approximately 135° C. At this temperature the addition of the catalyst to the epoxy alone produced no observable homopolymerization. Elevated temperatures are required to catalyze the homopolymerization.

The reaction mixture may be characterized by differential scanning calorimetry (DSC), nuclear magnetic resonance (NMR), high performance liquid chromatography (HPLC), ultraviolet-visible (UV-VIS) absorption and size exclusion chromatography. The results obtained by these conventional techniques indicate that the a first curing agent such as PNA is incorporated into the epoxy polymer backbone.

The reaction conditions used in the present invention will vary depending on the particular reactants used. Generally, the reactants i.e. components (A) and (B) are mixed together to form a solution and then heated to a temperature such that the components will react. The reaction process of the present invention is preferably carried out at a temperature of from about room temperature (about 20° C.) to about 300° C. and more preferably from about room temperature to about 250° C. Above about 300° C. degradation of the epoxy polymer may occur and below about room temperature no reaction may occur.

Optionally, the reactants are degassed to less than about $1 \times 10^{-2}$ Torr. The degassing is preferred to remove bubbles and moisture which may degrade the final product. The degassing is generally carried out a temperature at which the reactants have a reduced viscosity. While the degassing temperature depends on the reactants used, generally the degassing temperature is below the temperature of sublimation of reactants or below the reaction temperature.

The reaction process of the present invention is preferably carried out under an inert atmosphere such as nitrogen. The reaction mixture is heated under nitrogen to until a substantially polymerized product is obtained. Generally, the period of time for the reaction depends on the kinetics of the particular reactants, but preferably the reaction time is less than 5 hours and more preferably less than 1 hour. The reacted mixture is then cooled to room temperature for use.

As an illustration of another embodiment of the process of the present invention, a prepolymer is first prepared by reacting component (A) with less than 100 percent of a first curing agent and then reacting the prepolymer with a second curing agent.

The second curing agent compound may be used to substantially completely react the prepolymer which has been prepared by reacting less than 100 percent of a first curing agent (an NLO molecule) with an epoxy resin (component (A)). It is possible to completely use the prepolymer by continuing homopolymerization brought about by a catalyst. However, preferably, the prepolymer is fully cured using a second curing agent such as metaphenylinediamine, because the final product exhibits certain improved properties obtained by using the second curing agent such as greater stability and higher glass transition temperature. The prepolymer material is also preferred because it provides a final film product with improved properties such as film quality, optical clarity and stability. A sufficient amount of the second curing agent is added to the prepolymer to substantially react all of the remaining epoxy groups.

The present invention provides a thermoset polymeric composition with good thermal stability and resistance to chemical attack. It is also advantageous to provide epoxy resin based polymers having NLO properties because epoxy based polymers per se have heretofore been shown to have resistance to chemical attack. This property is provided by the crosslinking of the polymeric chains during polymerization.

The polymeric material of the present invention generally contains a glass transition temperature of from about 90° C. to about 300° C., preferably above about 140° C. and more preferably above about 160° C.

The present invention provides a composition with nonlinear optical properties with improved stability. The increased stability arises from the incorporation of a NLO group into the backbone of a polymer as opposed to blending a molecule with electron-withdrawing groups with a polymer host.

The epoxy based thermoset compositions of the present invention can be in the form of sheets, films, fibers or other shaped articles by conventional techniques. Generally, films are used in testing, electrooptic devices and waveguide applications.

A film can be prepared, for example, by constraining a mixture of components (A) and (B) between two planar substrates and then polymerizing the mixture to form a thin film. The films used for testing, electrooptic devices and waveguides should be thin films. Generally, the film has a thickness of from about 500 Angstroms to about 500 microns. Preferably, the thickness of the film is from about 1 micron to about 25 microns.

The mixture of epoxy resins reacted with a first curing agent (aromatic amines with electron-withdrawing groups), preferably with the addition of other curing agents is placed on a surface to make a film. The film may be produced in a number of ways. For many prepolymer mixtures with low viscosity a substrate is required. The mixture may be spread over the surface by compression with another substrate, dip, spray, or spin coating. Thermal processing of the mixture disposed on a substrate and the ultimate thermal and mechanical properties of the resultant polymer is dependent on the type of epoxy resin and curing agent(s) utilized. The degree of stability required will then determine the type of polymer components needed. The techniques for mixing and polymerizing are similar to those known in the state of the art. One aspect of the polymerization which improves the mechanical properties of the film is the schedule of temperature ramping of the mixture to its final cure temperature. By staging the cure at intermediate temperatures the optimal network structure is obtained. Retaining the final cure temperature for a period of hours is often necessary for the most complete polymerization possible. The long term chemical and mechanical stability of the final polymer will be dependent on the network formed.

After the polymerization of the mixture, the resulting film is oriented to produce a film with anisotropic properties needed for second harmonic generation. The film can be oriented by applying an external field to the film.

The term "external field" as employed herein refers to an electric, magnetic or mechanical stress field which is applied to a substrate of mobile organic molecules to induce dipolar alignment of the molecules parallel to the field.

For example, application of a DC electric field produces orientation by torque due to the interaction of the applied field and the net molecular dipole movement. AC and magnetic field fields also can effect alignment. Mechanical stress induced alignment includes a physical method such as stretching a thin film or a chemical method such as coating a liquid crystalline surface with an aligning polymer such as nylon.

The orientation in this instant is preferably achieved by corona poling or parallel plate poling. For parallel plate poling the film must be near and parallel to two electrodes with a large potential difference while the polymer is near to or above its glass transition. The electrodes can be associated with the substrate used for the formation of the film. For example, the substrate can be coated with a layer of indium-tin-oxide. If there are ionic impurities in the polymer mixture then the electrodes may be shielded with dielectric layer to prevent electrical breakdown. To obtain free standing films after the orientation process, a release layer is often deposited on the substrate before the mixture placed onto it. Other configurations involving air or vacuum gaps can also be used. The electric field continues to be applied until the temperature of the polymer is reduced to room temperature. This allows for the relaxation of the polymer to its highest density while still having the field applied. This densification should reduce any relaxation due to mobility of pendant side-chains within voids in the polymer.

Generally, in preparing NLO materials with second order susceptibility, $X^{(2)}$, the NLO functionalities in the polymer must have a relative alignment for the polymer to exhibit NLO properties. Typically, an electric field is applied to orient the moieties in the polymer for nonlinear optical effect. This type of orientation is referred to herein as electric field poling, parallel plate poling, or poling. Other conventional methods for the orientation of the NLO moieties can be carried out by corona poling or through stretching the polymer.

In electric field poling, the polymeric material is raised above its glass transition temperature, $T_g$, because in this state, large molecular motion is enhanced, and the nonlinear optic moieties can give a net orientation. However, orientation of the polymer has been observed to occur below the $T_g$. An intense electric field is then applied to the polymeric composition to align the nonlinear optic moieties. Electric field strengths of between about 0.05 to about 1.5 megavolts per centimeter (MV/cm) can be applied. The film is then cooled to room temperature with the electric field still applied. The field is then removed, resulting in a system where the nonlinear optic moieties are aligned within the polymer matrix.

The orientation of the anisotropic units within the film can occur during or after polymerization. One method of orientation includes applying an electric field to a polymer film which has previously been prepared and polymerized.

Another method of orientation of the polymer of the present invention for producing nonlinear optical materials, includes polymerizing the polymer while the polymer is under an electric field such that the nonlinear optical moieties are aligned in the electric field before complete polymerization of the polymer takes place. This method of orientation will allow less stress on the ultimate polymer chain than if the electric field is applied after the NLO moieties are incorporated into the backbone of the polymer.

Another method for preparing thin films for nonlinear optical applications includes annealing of the polymer while simultaneously poling the polymer which will allow relaxation of the polymer around the oriented molecule. This process for producing an epoxy nonlinear optical polymeric film comprises raising the temperature of an epoxy polymeric film containing NLO moieties to above the glass transition temperature of the polymer, poling the film to orient the NLO moieties, lowering the temperature to below the glass transition temperature, and annealing for a period of time whereby a stable NLO polymeric film is obtained. After the temperature of a polymer has been raised to above the $T_g$ and the polymer has been poled, the temperature is reduced from about 10° C. to about 30° C. below the $T_g$ and maintained at this lower temperature to allow for densification. This "annealing" step is carried out so as to cause a reduced free volume in the film and thus less room for NLO moieties to randomly reorient themselves which can lead to a decrease in the NLO signal. Thus, this annealing process during polymer orientation may advantageously improve the stability of the polymer.

The nonlinear optical response of a polymer is determined by the susceptibility of the polymer to polarization by an oscillating electromagnetic field. The most important polarization components of a medium in contact with an electric field are the first order polarization components, i.e., the linear polarization, the second order polarization, i.e., the first nonlinear polarization, and the third order polarization, i.e., the second nonlinear polarization. On a macroscopic level this can be expressed as:

$$P = X^{(1)}E(\omega 1) + X^{(2)}E(\omega 1)E(\omega 2) + X^{(3)}E(\omega 1)(\omega 2)(\omega 3)$$

where
P is the total induced polarization
E is the electric field at the frequency ($\omega_i$), and
$X^i$ are the susceptibility tensors for the linear, and first and second order nonlinear component of the polarization.

Specific components of the susceptibility tensor can be related to measurable coefficients. For second harmonic generation the second harmonic coefficient $d_{ijk}$ is defined by:

$$d_{ijk}(-2\omega; \omega, \omega) = (\tfrac{1}{2}) X_{ijk}(-2\omega; \omega, \omega)$$

Because of the degeneracy of two of the fields in second harmonic generation, the standard notation for writing this coefficient is $d_{iu}(-2\omega; \omega, \omega)$. For the specific case where polymer films are oriented with their anisotropic components normal to the film surface the coefficient $d_{33}$ can be determined as detailed in Applied Physics letters vol. 49 (5) p. 248-250 (1986). From a knowledge of the susceptibilities the molecular polarizabilities can be calculated if the molecular dipole moment, the number density of the nonlinear molecules, the internal electric field, and correction factors for local field effects are known. This calculation, also detailed in the above article, allows the determination of the first order hyperpolarizability, $\beta$, and the second order hyperpolarizability, $\gamma$. To achieve a significant second order polarization it is essential that the nonlinear medium exhibit second order susceptibility, $X^{(2)}$, be greater than $10^{-9}$ esu. To achieve a significant third order polarization it is essential that the nonlinear medium exhibit third order susceptibility, $X^{(3)}$, be greater than $10^{-13}$ esu.

A number of optical tests can be used to evaluate the nonlinear optical properties of the poled polymer films of the present invention. For example, the second order susceptibility components of the polymer can be tested by measuring the linear Pockels electro-optic effect, second harmonic generation (SHG), or frequency mixing. For example, the third order susceptibility components of the polymer can be measured by third harmonic generation (THG), nonlinear mixing, Kerr effect, degenerate four wave mixing, intensity dependent refractive index, self-focusing, quadratic Kerr electro-optic effect, and electric field induced second harmonic generation. Such optical tests and procedures are well known to those skilled in the art.

The Maker fringe technique is a conventional procedure used herein to determine the second order susceptibility properties of films. In accordance with this test procedure, the magnitude of the intensity of the light generated at the second harmonic of the incident frequency by the polymeric film sample can be measured as a function of the incident angle of the light irradiating the sample surface. If the film is oriented such that the anisotropic groups have a net orientation normal to the surface the largest second harmonic coefficient, $d_{33}$, can be determined using p-polarized incident radiation.

Typically a Q-switched YD:YAG laser which emits electromagnetic radiation at 1.064 microns, has a pulse half width of 14 ns, a repetition rate of 10 Hz, and is p-polarized, is focused onto a sample on the rotation axis of a rotary stage. The light emitted from the sample is filtered to remove the incident frequency and a spike filter centered near the second harmonic to allow passage of substantially only the second harmonic. Typically, the spike filter is centered at 530 nm and has a half width of 10 nm. The light is detected by a photomultiplier and averaged by a boxcar which is triggered by the incoming laser pulse. The averaged output of the boxcar was collected by a computer as a function of the angle of incidence of the incident beam on the sample.

The second harmonic coefficient was calculated using the equations described in Applied Physics Letters volume 49, page 248-250 (1986) by K. Singer et al. The incident energy density on the sample is obtained by calibration with a known quartz sample. A Y cut quartz slab is placed on the rotation stage in the same position as the polymer sample to be tested. The energy density is calculated from the given equations knowing the coefficient $d_{11} = 1.1 \times 10^{-9}$ esu. The intensity as a function of incident angle for the polymer test sample is then fit by the computer with the additional information of incident energy density, film thickness, and indices of refraction at the incident and second harmonic wavelength.

The polymers of the present invention have high stability (both thermal and chemical). An important feature of the NLO polymers derived from epoxy resins of the present invention is an added stability of the NLO signal of said polymers because the NLO groups are covalently bound into the polymer chain. This improvement of the stability is related to the level of crosslinking of the polymer chain.

Enhanced stability may be determined by observing the decay of the NLO capabilities as a function of time at room temperature. However, this determination may be very time consuming. A more straight forward approach to determining stability is to observe the NLO signal at room temperature after exposure to elevated temperatures for periods of time necessary to allow relaxation of the NLO effect. It has been found that the relaxation of the NLO effect is very rapid and the level is dependent on the temperature. The higher the temperature before relaxation of the NLO effect the more stable the polymer will be at room temperature. It is possible to calculate an activation energy for the relaxation of a particular NLO polymer. Another measure of the stability of a polymer's NLO effect is the ability to retain a certain percentage of the original NLO activity after exposure to an elevated temperature. One standard percentage would be 67.5 percent of the original value. The definition of a "stable" NLO polymer herein means the ability to retain greater than about 67.5 percent of the original NLO activity after exposure to a specified temperature for 15 minutes.

Nonlinear optical materials have many potential applications using harmonic generation for shifting laser light to shorter wavelengths, parametric oscillation for shifting laser light to longer wavelengths, phase conjugation (four-wave mixing), and sum frequency generation for applications such as modulation and switching of light signals, imagining/processing/correlation, optical communications, optical computing, holographic optical memories, and spatial light modulators.

The films of the present invention are particularly useful in the electronic and communications fields to alter incident electromagnetic waves by the optical properties of the films. More particularly, the films of the present invention are used for waveguides and electrooptic modulators.

In another embodiment of this invention, there is provided an electrooptic light modulator or optical parametric device with a (noncrystalline second order) polymeric nonlinear optical component and a means for providing an optical input to and output from said component. The component comprises an optically transparent medium of a polymer characterized by the reaction products of an epoxy resin compound (A) and a curing agent compound (B) whereby at least a portion of the curing agent (B) is at least a first curing agent which contains (a) an average of more than one active amine hydrogen atom per molecule and (b) an average of at least one aromatic ring which contains at least one pendant monovalent electron-withdrawing group. When the device is employed in an electrooptic mode it includes means for applying an electric field and/or optical input to said element for altering an optical property.

One problem in obtaining an optically nonlinear medium for device applications is the difficulty in providing stable uniform crystalline structures and thin films of such materials in a manner suitable for integrated devices. A media has been developed which is used in electrooptic and optical parametric devices which provide improved stability by means of incorporation of NLO active functionalities into the backbone of noncrystalline epoxy based polymers.

The basis for any nonlinear optical device is the nonlinear optical medium therein. It has been found that to obtain a long lived polymeric media comprising an oriented second order nonlinear material that the NLO active component must be bound into the polymer chain to provide the stabilization to thermal forces which would randomize the orientation. Such a nonlinear optical media can be prepared directly on a desired substrate or can be a free standing film or tape. It may be noted that this optically nonlinear media can be utilized as an optical waveguide incorporated into electrooptic devices.

Media which can be used in electrooptic devices are described in the following examples. The films suitable for use in electrooptic devices may be either free standing or on substrates. The substrates may be rigid as in the case of glass, quartz, aluminum, silicon wafer, or indium-tin-oxide coated glass. For use in waveguide devices the NLO media must be adjacent to another media suitable for waveguiding conditions, for example, other polymeric materials with a lower index of refraction, such as, fluorinated hydrocarbon materials, or quartz or glass substrates. Electrodes of conductive material with a higher index of refraction may be coated with polymeric materials of lower index to allow electrooptic modulation.

The following examples are for illustrative purposes only and are not to be construed as limiting the scope of the invention in any manner.

EXAMPLE 1

This example illustrates the preparation, polymerization, subsequent poling, and testing of an epoxy resin, an aliphatic curing agent, and paranitroaniline.

A flask is charged with 10.02 grams of diglycidyl ether of bisphenol A (DGEBA) having an epoxide equivalent weight (EEW) of 171.4, 0.283 grams of paranitroaniline (PNA) (from Alldrich Chemical Company, Milwaukee, Wis.) and less than 0.01 grams of 2-methyl-imidazole. The flask was heated under vacuum to $1 \times 10^{-3}$ until the temperature reached approximately 80° C. The flask was then purged with nitrogen and heated to a temperature of 140° C. for approximately 10 minutes. A change in color from yellow to dark amber was observed between 100° C. and 140° C. The temperature was then reduced to room temperature (about 20° C.).

The reaction of the PNA with the epoxy resin was tested by size exclusion chromotography. This technique discriminates materials based primarily on the size of the molecules. Molecules which are larger pass through a column more quickly than a smaller molecule made of the same material. The starting materials DGEBA and PNA were observed separately and together as a mixture before reaction. The retention times are similar for the separate components and the mixture. This acts as a baseline for our testing of the heated material. A sample of the mixture was taken after heating to about 92° C. when the first sign of color change appears. This sample showed small peaks at shorter retention time indicating a larger size molecule. Another sample of the mixture taken after 10 minutes at about 140° C. was then tested. This second sample showed easily observable peaks at the same retention times as those of the sample heated to 92° C. only larger compared with the peak due to PNA. All of these new peaks are at retention times longer than that observed for DGEBA indicating that these new peaks are due to molecules larger than DGEBA. The PNA peak in the sample heated to 140° C. has almost disappeared. The conclusion drawn from these results is that the larger molecules produced by the heating of DGEBA and PNA are some combination of DGEBA and PNA.

Results of HPLC and NMR testing on similarly prepared samples are in agreement with size exclusion chromotography results.

From this mixture 1.83 grams were transferred to another flask and 0.258 grams of linear triethylene-tetramine was added. This mixture was stirred and placed on a vacuum line to degas the mixture.

A small amount of this mixture was placed between two dielectrically coated electrodes. The electrodes consisted of indium-tin-oxide (ITO) on glass. The electrodes were covered with a 75 micron layer of polyester film sealed in place with a transparent adhesive. The polyester film was coated with a plasma polymerized tetrafluoroethylene layer. The sample mixture was placed in the center of a 25 micron spacer layer on one of the film covered electrodes. The second dielectrically coated electrode was placed on top of the mixture and the electrodes were held in place by spring clips.

The sample was polymerized (cured) at 100° C. for 30 minutes and 170° C. for 30 minutes and then slowly brought to room temperature. Electrical contact was then made between the electrodes and a high voltage source. The equivalent of 225,000 volt/cm was applied across the epoxy containing mixture. The mixture was heated to 170° C. and cooled to 150° C. over a period of 30 minutes and then slowly to room temperature with the field still applied.

The sample was then removed from the electrodes and tested for its nonlinear optical properties. The sample was positioned on a stage and illuminated by a beam form a ND:YAG laser with a 10 nanosecond pulse width and a repetition rate of 30 Hz. The beam energy was reduced to approximately 0.05 millijoule/pulse and focused to a spot approximately 100 microns. The incident beam having a wavelength of 1.064 microns was filtered to remove any higher frequencies and polarized for p-polarized incidence on the sample. The radiation transmitted through the sample was filtered to remove any 1.064 micron light. This filtered radiation illuminated a photomultiplier tube. The signal was averaged by a boxcar averager and sent to a computer. The sample was rotated on an axis perpendicular to the incident light and the transmitted radiation was monitored as a function of incident angle.

The second harmonic coefficient was calculated from the equations described in Applied Physics Letters volume 49, page 248-250 (1986). The incident energy density was calculated measuring the second harmonic intensity as a function of angle for a Y cut quartz slab and its known second harmonic coefficient. The second harmonic coefficient for the polymer sample was calculated using the incident energy density, the film thickness, and indices of refraction for the film of 1.55 at 1.064 microns and 1.57 at 532 nm. Using these values the $d_{33}$ value was determined to be $8 \times 10^{-10}$ esu.

EXAMPLE 2

This example illustrates the preparation of a film exhibiting non-linear optical response.

A flask is charged with 10.25 grams of DGEBA having an EEW of 171.4, 0.228 grams of para-nitroaniline (PNA) (Alldrich Chemical Company, Milwaukee, Wis.), and 0.012 g of 2-methylimidazole. The flask was heated under pressure of $1 \times 10^{-3}$ torr until the temperature reached 80° C. The flask was then purged with nitrogen and heated to approximately 145° C. for four hours. The temperature was then reduced to room temperature.

Three grams of the mixture in the flask were transferred to a 50 ml flask and 0.41 grams of the aliphatic amine curing agent, triethylenetetramine was added. This mixture was stirred and degassed.

This mixture was then placed on glass between two dielectrically coated electrodes. The electrodes consisting of indium-tin-oxide (ITO) were covered with a 50 micron layer of polyester film sealed in place with a transparent adhesive. A coating of teflon was plasma polymerized onto the polyester film. The epoxy mixture was placed in the center of a 25 micron teflon spacer layer on one of the film covered electrodes and then the second dielectrically coated electrode was placed on top of it.

Electrical contact was made between the electrodes and a high voltage supply. The equivalent of between 300,000 and 400,000 volt/cm was applied across the epoxy containing mixture. The fixture was heated to 60° C. for 1 to 2 hours, then at 100° C. for one hour, and finally to 160° C. for two hours. The temperature was then reduced to room temperature with the electric field still applied.

The sample was then removed from the electrodes and tested for nonlinear optical capability using the Maker fringe technique. The sample was affixed to a stainless steel holder which could reproduceably placed in the same position on a test rotation stage. This allows the same position on a sample to be tested over a period of months. The sample was illuminated by a laser beam from a ND:YAG laser with wavelength of 1.064 microns and having a pulse width of 10 nanoseconds and a repetition rate of 30 Hz. The beam energy was reduced to about 0.02 millijoules/pulse and focused to spot size of about 100 microns in diameter. The incident beam was filtered to remove any wavelengths shorter then 1.064 microns and having a p-polarization with respect to the sample. The transmitted radiation through the sample was filtered to remove any radiation having a wavelength longer than 500 nm. In addition, a spike filter was added to allow the transmission of light centered at 530 nm and a bandpass less than 10 nm. The filtered transmission through the sample was illuminated a photomultiplier. The signal was detected averaged by a boxcar which was triggered by the incident laser pulse. The averaged output was collected by a computer as a function of the angle of the incident light. The sample was rotated on a stage which was computer controlled.

The second harmonic coefficient was calculated from the intensity as a function of angle data using the equations described in Applied Physics Letters volume 49, p. 248-250 (1986) by K. Singer, et al. The incident energy density on the sample was measured using the signal from a Y cut quartz slab having a $d_{11} = 1.1 \times 10^{-9}$ esu. The coefficient was determined by incident energy density, the film thickness of 25 microns, and the index of refraction which was measured on similarly prepared samples to be 1.593 at 532 nm and 1.577 at 1.064 microns. The initial value of the second harmonic coefficient was calculated to be about $3 \times 10^{-9}$ esu. The second harmonic coefficient was measured as a function of time after poling the sample at room temperature and is shown in Table 1 relative to its initial value.

TABLE 1

| Time (days) | Second Harmonic Coefficient (% relative) |
|---|---|
| 0 | 100 |
| 0.5 | 100 |
| 1 | 95 |
| 2 | 94 |
| 7 | 88 |
| 30 | 66 |
| 90 | 53 |

COMPARATIVE EXAMPLE A

This example illustrates the nonlinear optical signal from a typical epoxy resin and curing agent without additional molecules known in the art to produce NLO signals in guest host systems.

A flask was charged with 2.21 grams DGEBA having an EEW of 171.4 and 0.31 grams of linear triethylenetetramine. The mixture was stirred and degassed on a vacuum line.

This mixture was placed between two electrodes, polymerized and poled in a manner similar to that described in Example 2, except that the electric field was 300,000 volt/cm.

The sample was tested in the same manner as Example 2. The $d_{33}$ value calculated was $9 \times 10^{-11}$ esu.

COMPARATIVE EXAMPLE B

This example illustrates the stability of nonlinear optical properties of epoxy based polymers in which the nonlinear optical group is not covalently reacted into the chain.

Using the same DGEBA epoxy resin having an EEW of 171.4 as described above in Example 2 and sufficient methyl nitroaniline to react with approximately 7 percent of the available epoxide groups were combined. The mixture was heated to approximately 70° C. to dissolve the methyl nitroaniline into the epoxy resin. No catalyst was added to the mixture. The mixture was cooled to room temperature and sufficient triethylene tetramine having an amine equivalent weight of 24 to complete the cure of the epoxy resin based on no reaction having taken place between the methyl nitroaniline and the epoxy.

A film was made and tested in a manner similar to that described above in Example 2. Table 2 shows the relative second harmonic coefficient initially measured and after 24 hours.

EXAMPLE 3

This example illustrates the nonlinear optical properties of an epoxy polymer polymerized completely with an aromatic amine with NLO properties.

TABLE 2

| Time (days) | Second Harmonic Coefficient (% relative) |
|---|---|
| 0 | 100 |
| 1 | 48 |

A flask was charged with 8.18 grams of DGEBA having an EEW of 171.4 and 3.298 grams of paranitroaniline (PNA). The flask was heated under vacuum to 70° C. and then flushed with nitrogen. Heating was continued until 122° C. when the PNA had dissolved. The mixture was cooled and less than 0.02 grams of 2-methyl imidazole was added. This mixture was polymerized at 190° C.

Some of the polymer produced in the above sample was placed between electrodes as described in Example 2. This material was heated to 270° C. and an electric field, 225,000 volt/cm, was applied across the sample.

While the resultant film's quality was not as good as in Example 1, a second harmonic signal was detected from the film at 45° incidence angle.

EXAMPLE 4

This example shows the nonlinear optical activity of an epoxy based film with disperse orange 3 incorporated into the backbone of a polymer.

A 4.06 g of DGEBA having an EEW of 171.4 was combined with 0.144 g of disperse orange 3 (DO3) and less than 0.005 g of 2-methyl imidazole. This mixture was heated under vacuum to approximately 80° C. and then purged with nitrogen while heating was continued to 140°-150° C. This mixture was cooled to near room temperature. A small amount of this material was tested by NMR to observe the reaction of the DO3 with the epoxy resin. The data indicate that the amine functionality observed at 6.1 ppm in deuterated chloroform and DMSO decrease relative to the starting material. An estimate of the relative areas before and after heating indicates that 80 percent of the D03 has reacted with the epoxy resin. To this sample 0.54 g of triethylenetetraamine (TETA) was added to complete the polymerization. This combination was mixed and degassed. A small amount of this mixture was placed between dielectrically covered electrodes with a 100 micron spacer. The sample was oriented with a field of approximately 0.4 megavolts per centimeter (Mv/cm). The temperature of the sample was increased to 50° C. for one hour, followed by 100° C. for one hour, followed by 170° C. for approximately one hour. The sample was cooled with the field still in place. The sample was removed from the electrodes and tested in the same manner as described in Example 2. The Maker fringe pattern was fit to the equations of Jerphagnon and Kurtz, J. Applied Physics 41(4) 1667-81 (1970). The incident energy density was determined by reference to the single crystal of quartz. The fitting procedure indicated that the $d_{33}$ value for this film was approximately $2 \times 10^{-9}$ esu. This value dropped to $1 \times 10^{-9}$ after one week at room temperature.

EXAMPLE 5

This is an example of preparing a nonlinear optic film using simultaneously annealing and poling techniques.

Polymers containing NLO molecules are raised above the Tg of the polymer and a field is applied to orient the NLO molecules. After a period of time of an hour or more has elapsed to allow the NLO groups to align with the field, the temperature is decreased below the Tg by 10°-20° C. and held there for a period of time sufficient to allow the polymer to relax. After sufficient annealing time has elapsed the temperature of the sample is decreased slowly to room temperature to allow any further annealing to occur. This relaxation effect can be observed by changes in the response of the polymer to dynamic mechanical spectroscopy (DMS), qualitatively by changes in the differential scanning calorimetry (DSC) response, and by changes in the density of the material as measured by Archimedes principle. These tests can show that the polymer chains have relaxed and are in a more stable conformation than a quenched sample.

EXAMPLE 6

PNA and DGEBA having an EEW of 171.4 were mixed together in a manner similar to that described in Example 2 except that the percentage of PNA relative to the number of epoxy groups was approximately 10 percent. The sample was heated before the addition of the catalyst 2-methyl imidazole to 150° C. A small amount of this material was dissolved in deuterated dimethyl sulfoxide (d-DMSO) and examined by proton NMR. A peak was observed near 6.2 ppm which was attributed to the amine protons of PNA. A comparison of the areas under the peaks for DGEBA and FNA for this sample showed a ratio of 10:1 indicating that very little proton exchange or reaction had occurred. Approximately 0.1 percent by weight of a catalyst, 2-methyl imidazole, was added to the heated mixture of DGEBA and PNA. The catalyst containing mixture was heated to about 142° C. A color change occurred above 100° C. which was not observed with the catalyst absent. The sample was cooled and another small amount was dissolved in d-DMSO and examined by H-NMR. This time the peak at 6.2 ppm had disappeared relative to the aromatic proton signals from the resin which are observed between 6.7 and 7.2 ppm. The disappearance of the signal from the amine proton indicated that it had reacted. The most likely reaction pathway is with the epoxy group of the resin.

EXAMPLE 7

DGEBA having an EEW of 171.4 and enough PNA to react with about 10 percent of the epoxy units were combined and heated to 150° C. for 15 minutes. A small amount was taken from this mixture and analyzed by high performance liquid chromatography (HPLC). This material showed two peaks corresponding to the PNA and epoxy resin as determined by analysis of each component separately. Without the addition of a catalyst no additional peaks were observed in this mixture. When the epoxy resin alone was combined with the catalyst, 2-methyl imidazole, and heated to 145° C., no additional peaks were observed in the HPLC spectrum. Even upon further heating to 175° C. no reaction products were observed for a mixture of epoxy resin and catalyst. When the epoxy resin and PNA mixture described at the beginning of this example had 0.1 percent by weight catalyst, 2-methyl imidazole, added and heated to 145° C., reaction products were observed by HPLC. Along with the appearance of reaction products the amount of PNA was substantially reduced. Roughly 90 percent of the PNA was reacted to form a material with higher molecular weight than PNA or the epoxy resin. From the relative areas of the resin and PNA before and after heating with the catalyst, it is demonstrated that the PNA and epoxy react to form oligomers. In this way PNA is combined with the epoxy resin. Further reactions can be carried out with these oligomers to produce a fully polymerized and crosslinked polymer.

What is claimed is:

1. A composition exhibiting a second order NLO susceptibility greater than $10^{-9}$ esu comprising the reaction product of:
   (A) at least one compound containing an average of more than one epoxide group per molecule; and
   (B) at least one curing agent for compound (A) containing a conjugate group having (a) one electron-donating group and (b) one monovalent electron-withdrawing group directly attached thereto, said curing agent having
       an average of more than one active amine hydrogen and
       an average of at least one aromatic ring which contains said monovalent electron-withdrawing group per molecule.

2. The composition of claim 1, wherein the curing agent is represented by the formula:

A—Ar—X where A is the pendant monovalent electron-withdrawing group, Ar is the conjugating group and X is the electron-donating group.

3. The composition of claim 2 wherein A is selected from the group consisting of $NO_2$, CN, CHO, $CO_2R$, $CO_2NH$, $-P(O)(OR)_2$, $-PR_3^+$, $-NR_3^+$, and $-SR_2^+$ where each R is independently a hydrogen or an aliphatic, cycloaliphatic or aromatic hydrocarbon having from 1 to about 12 carbon atoms; Ar is selected from the group consisting of

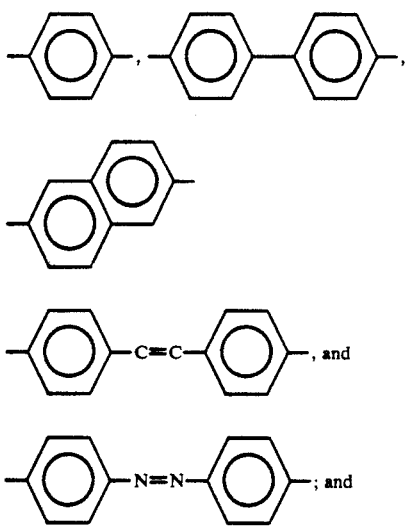

X is —NH₂.

4. The composition of claim 1 wherein the curing agent is represented by the formula:

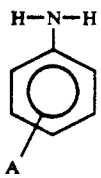

where A is as defined hereinabove in claim 3.

5. The composition of claim 1 wherein the curing agent is represented by the formula:

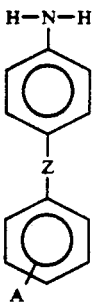

where A is as defined hereinabove in claim 3 and Z is an azo or olefinic moiety.

6. The composition of claim 4 wherein A is $NO_2$.

7. The composition of claim 5 wherein A is $NO_2$.

8. The composition of claim 7 wherein Z is selected from —N=N— or —C=C—.

9. The composition of claim 1 wherein said electron-withdrawing group has a level of electron withdrawing capability (Hammett constant) of greater than about 0.52.

10. The composition of claim 1 wherein curing agent (B) optionally further includes a second curing agent.

11. The composition of claim 10 wherein the second curing agent is selected from the group consisting of amines, amides, sulfides, anhydrides and combinations thereof.

12. The composition of claim 11 wherein the amount of the first curing agent present in the product is from about 0.1 percent to about 100 percent and the amount of the second curing agent present in the product is from about 99.9 percent to zero percent based on the total amount of component (B).

13. The composition of claim 1 wherein the component (A) is an epoxy compound containing an average of more than one glycidyl group per molecule.

14. The composition of claim 13 wherein the epoxy compound is selected from the group consisting of glycidyl ethers, glycidyl esters and glycidyl amines.

15. The composition of claim 14 wherein the glycidyl ether is a glycidyl ether of a bisphenol or substituted bisphenol.

16. The composition of claim 15 wherein the glycidyl ether is a glycidyl ether of bisphenol A.

17. The composition of claim 1 including a catalyst.

18. The composition of claim 17 wherein the catalyst is selected from the group consisting of tertiary amines, phosphonium compounds, ammonium compounds, sulfonium compounds, and mixtures thereof.

19. A process for producing a polymeric composition comprising reacting:
(A) at least one compound containing an average of more than one epoxide group per molecule; and
(B) at least one curing agent for compound (A) containing a conjugate group having (a) one electron-donating group and (b) one monovalent electron-withdrawing group directly attached thereto, said curing agent having
an average of more than one active amine hydrogen and
an average of at least one aromatic ring which contains said monovalent electron-withdrawing group per molecule, said polymeric composition exhibiting a second order NLO susceptibility greater than $10^{-9}$ esu.

20. The process of claim 19 wherein the curing agent is represented by the formula:

A—Ar—X where A is the pendant monovalent electron-withdrawing group, Ar is the conjugating group and X is the electron-donating group.

21. The process of claim 20 wherein A is selected from the group consisting of $NO_2$, CN, CHO, $CO_2R$, $CO_2NH$, —P(O)(OR)₂, —PR₃⁺, —NR₃⁺, and —SR₂⁺ where each R is independently a hydrogen or an aliphatic, cycloaliphatic or aromatic hydrocarbon having from 1 to about 12 carbon atoms; Ar is selected from the group consisting of

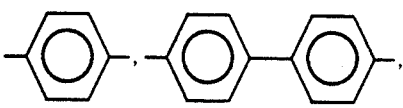

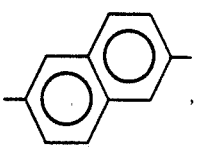

-continued

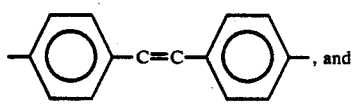, and

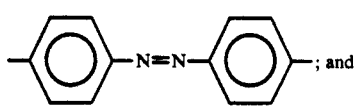; and

X is —NH$_2$.

22. The process of claim 19 wherein the curing agent is represented by the formula:

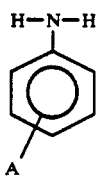

where A is as defined hereinabove in claim 3.

23. The process of claim 19 wherein the curing agent is represented by the formula:

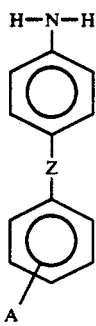

where A is as defined hereinabove, in claim 3 and Z is an azo or olefinic moiety.

24. The process of claim 20 wherein A is NO$_2$.

25. The process of claim 21 wherein A is NO$_2$.

26. The process of claim 23 wherein Z is selected from —N=N— or —C≡C—.

27. The process of claim 19 wherein said electron-withdrawing group has a level of electron withdrawing capability (Hammett constant) of greater than about 0.52.

28. The process of claim 19 wherein curing agent (B) optionally further includes a second curing agent.

29. The process of claim 28 wherein the second curing agent is selected from the group consisting of amines, amides, sulfides, anhydrides and combinations thereof.

30. The process of claim 28 wherein the amount of the first curing agent present in the product is from about 0.1 percent to about 100 percent and the amount of the second curing agent present in the product is from about 99.9 percent to zero percent based on the total amount of component (B).

31. The process of claim 19 wherein the component (A) is an epoxy compound containing an average of more than one glycidyl group per molecule.

32. The process of claim 31 wherein the epoxy compound is selected from the group consisting of glycidyl ethers, glycidyl esters and glycidyl amines.

33. The process of claim 32 wherein the glycidyl ether is a glycidyl ether of a bisphenol or substituted bisphenol.

34. The process of claim 33 wherein the glycidyl ether is a glycidyl ether of bisphenol A.

35. The process of claim 19 wherein the reaction is carried out in the presence of a catalyst.

36. The process of claim 35 wherein the catalyst is selected from the group consisting of tertiary amines, phosphonium compounds, ammonium compounds, sulfonium compounds, and mixtures thereof.

37. The process of claim 36 wherein the catalyst is 2-methyl imidazole.

38. A particle, film, fiber or sheet of the composition of claim 1.

* * * * *